W. R. GREEN.
ADJUSTABLE TIRE CARRIER.
APPLICATION FILED NOV. 15, 1916.
1,344,944.
Patented June 29, 1920.
2 SHEETS—SHEET 2.
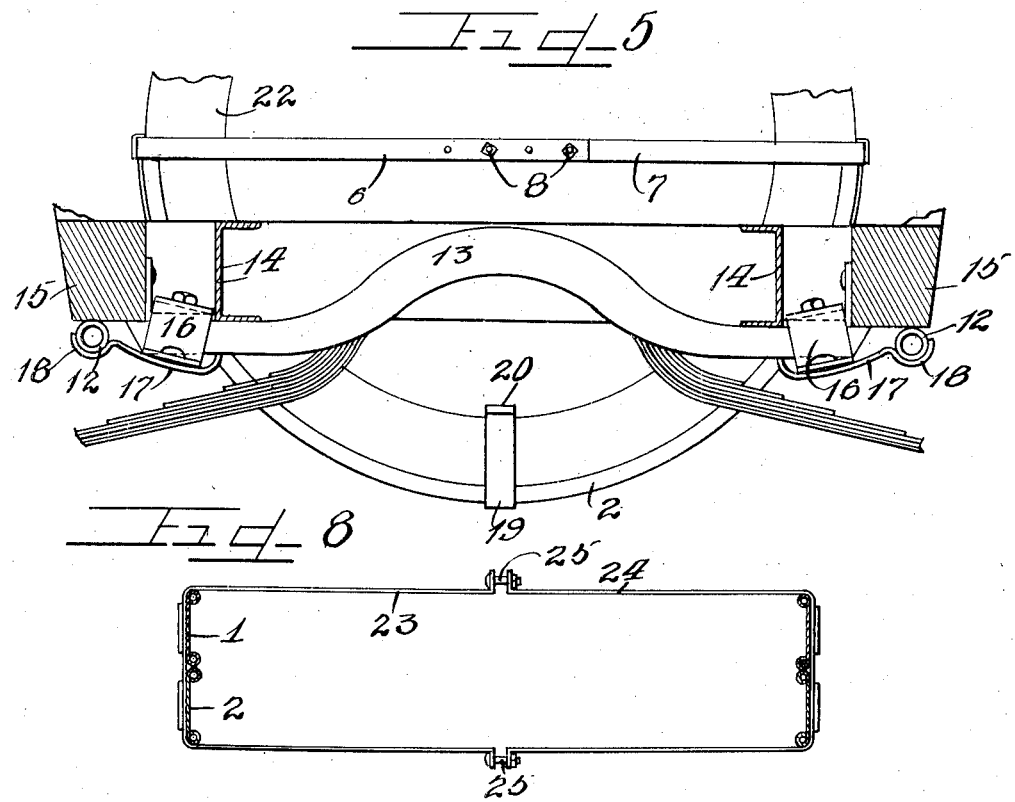
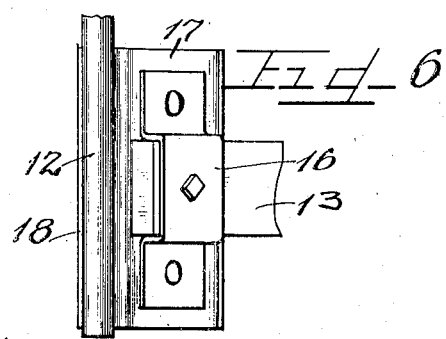
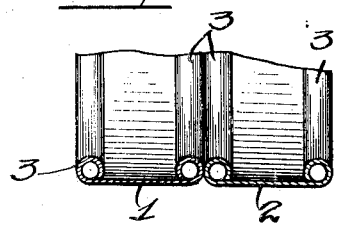
Witnesses
J. W. Angell
Charles W. Hill Jr.
Inventor
Walter R. Green
by Charles W. Hill
Atty.

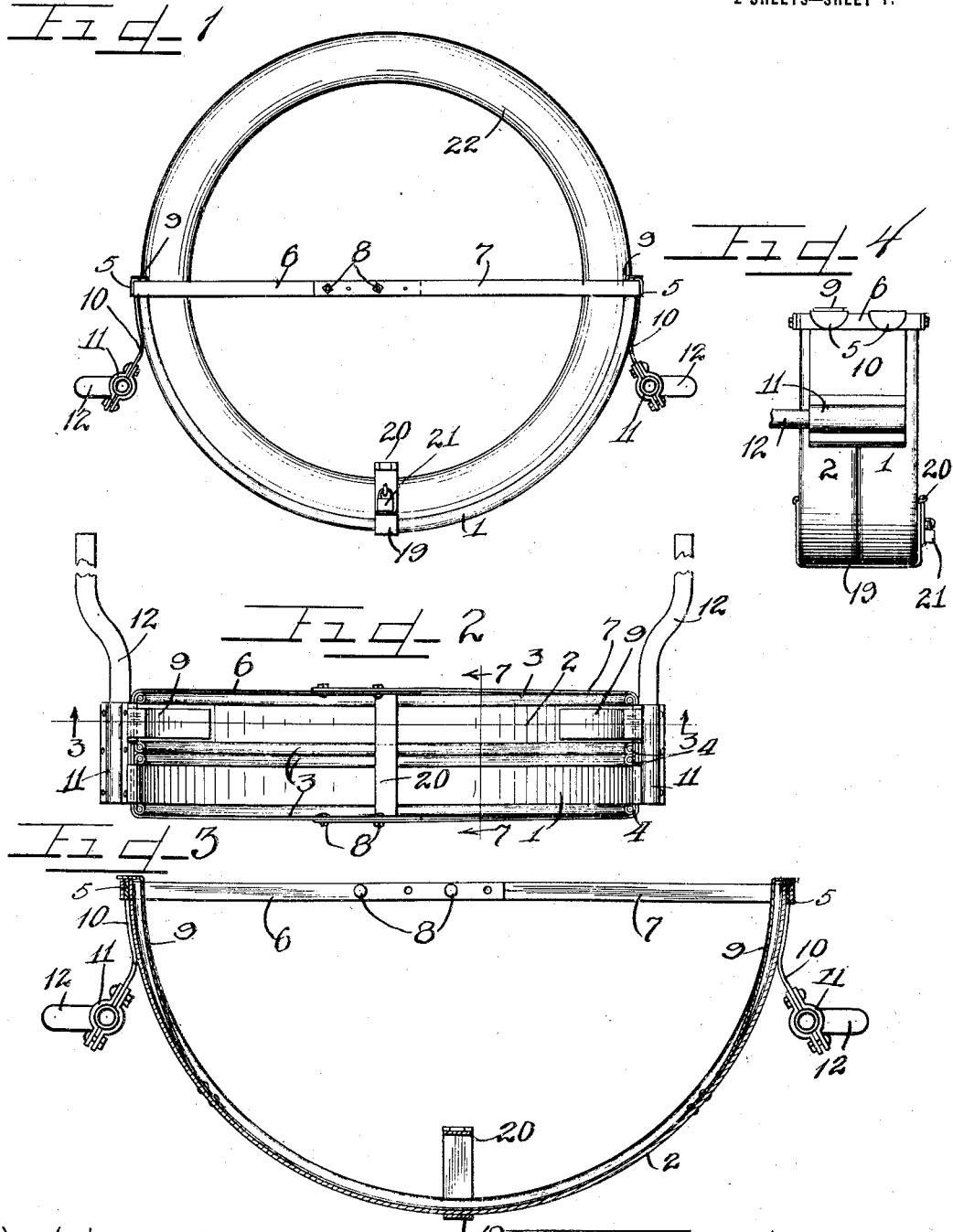

UNITED STATES PATENT OFFICE.

WALTER R. GREEN, OF CHICAGO, ILLINOIS.

ADJUSTABLE TIRE-CARRIER.

1,344,944.  Specification of Letters Patent.  Patented June 29, 1920.

Application filed November 15, 1916. Serial No. 131,393.

*To all whom it may concern:*

Be it known that I, WALTER R. GREEN, a citizen of the United States, and a resident of the city of Chicago, in the county of Cook and State of Illinois, have invented certain new and useful Improvements in Adjustable Tire-Carriers; and I do hereby declare that the following is a full, clear, and exact description of the same, reference being had to the accompanying drawings, and to the numerals of reference marked thereon, which form a part of this specification.

Difficulty has been experienced in the past in providing a tire carrier which is designed to receive a spare tire seated therein irrespective of whether or not the tire is mounted upon a rim due to the fact that after a tire has been in use, it has been found that the same has increased in diameter due probably to the centrifugal stretching action on the tire, and as a consequence, the tire will not fit properly into the carrier provided therefor.

It is an object of this invention to construct a tire carrier adapted to carry tires of slightly different size, adjustable to properly hold the same, and equipped with means automatically compensating for slight difference in sizes of tires.

It is a further object of this invention to construct an improved type of tire carrier which is simple to attach and holds the tire rigidly in position upon the motor car or other vehicle, and is adjustable both mechanically by shifting certain parts in their relation to one another, as well as adjustable automatically to compensate for different sizes of tires carried thereby.

The invention (in a preferred form) is illustrated in the drawings and hereinafter more fully described.

In the drawings:

Figure 1 is a front elevation of a tire carrier with a tire therein, constructed according to the principles of my invention.

Fig. 2 is a top plan view thereof.

Fig. 3 is a detail section taken on line 3—3 of Fig. 2, with parts shown in elevation.

Fig. 4 is an end view of the carrier.

Fig. 5 is a detail view partly in section and partly in elevation, illustrating the attachment of the carrier to the chassis of a motor car.

Fig. 6 is a fragmentary bottom plan view of one of the attaching brackets shown in Fig. 5.

Fig. 7 is a sectional detail taken on line 7—7 of Fig. 2.

Fig. 8 is a bottom sectional view with parts in elevation of a modified form of device.

As shown in the drawings:

The tire carrier in all its forms shown, is adapted to carry two tires, and consists of a semi-circular member 1, and another similar member 2, the side margins of each of which are beaded inwardly, as denoted by the reference numerals 3, and extending through the bead of each thereof if desired, are reinforcement rods or bars 4.

As clearly shown in Fig. 3, the upper margins of each of the members 1 and 2, are turned outwardly and downwardly as denoted by the reference numeral 5, around a rectangular U-bar, there being two provided as shown in Fig. 2, denoted respectively by the reference numerals 6 and 7, the ends of which overlap one another at the middle of the tire carrier. Bolts 8, are provided for engagement through apertures provided in the overlapping ends of U-bars 6 and 7, whereby an adjustment to change the length therebetween may be effected to contract or expand the tire carrier members 1 and 2, thus slightly changing their diameter. Riveted to the inner surface of the carrier member 2, near the upper ends thereof, are inwardly curved resilient plates 9, which, at their upper ends are flanged outwardly, to project over the upper end of the carrier members, and when a tire is placed into the carrier therebetween, said plates 9, are thrust outwardly, thus automatically compensating for slight differences in size of tires.

Riveted, brazed or otherwise rigidly secured to the exterior surface at the upper ends of the carrier members 1 and 2, are bracket plates 10, shown in Figs. 3 and 4, which, at their lower ends are angled outwardly and provided with a pair of circular clamping members 11, whereby the same may be clamped upon tubular arms 12. Means are provided for attachment of the tubular bracket arms 12, to the chassis of a motor car.

Referring to Fig. 5, the arched rear sill member 13, is attached to the parallel longitudinal sills 14, which together with the wooden side sills 15, of the body of the car are shown in section. Attached over the extended ends of the arched end sill member 13, are bracket plates 16, shown in detail in Fig. 6, and riveted thereto, are curved plates 17, provided with a semi-circular channeled or grooved marginal portion 18, in which the inner ends of the tubular bracket arms 12, are seated and held confined beneath the body sills 15, of the car, thus rigidly supporting said bracket arms in position.

Riveted, brazed or secured in any suitable manner beneath the respective carrier members 1 and 2, is a bar 19, which extends upwardly at the rear of the carrier, and is provided with a hinged bar or plate 20, adapted to latch over a staple secured in the bar 19, to receive a pad-lock 21, locked thereover whereby a tire, denoted by the reference numeral 22, shown in Figs. 1 and 5, may be locked in place.

In the modified form of device illustrated in Fig. 8, in place of the two U-shaped bracing bars 6 and 7, shown in Figs. 1 to 5, inclusive, I have illustrated two U-bars 23 and 24, respectively, the ends of which do not overlap but are flanged outwardly and provided with connecting bolts 25, which may be drawn up, thereby contracting the carrier members 1 and 2, to reduce the diameter thereof.

The operation is as follows:

In the form of device illustrated in Figs. 1 to 5, inclusive, the bent tubular bracket arms 12, are attached at the rear end of the motor car beneath the body sills 15, thereof, as shown in Fig. 5, by plates 17, which are bolted around the rear end sill 13, by means of the bracket plates 16. Said tubular bracket arms 12, are thus rotatable against friction in the retaining plates 17, so that the distance between the centers at the outer ends of said bracket arms may be varied in order to facilitate attachment of the tire carrier thereto. Said tubular arms are clamped between the members 11, which are secured upon the bracket plates 10, which in turn support the two associated beaded semi-circular tire carrier members 1 and 2, in upright position. The respective U-bars 6 and 7, connected on the upper ends of said tire carrier members 1 and 2, serve to stiffen and brace the same and also provide a means for changing the diameter of the associated members 1 and 2, by forcibly expanding or contracting the same, this being performed by shifting the bolts 8, in the different holes provided therefor in the overlapping ends of said U-bars 6 and 7.

In the form of device illustrated in Fig. 8, in place of the U-bars 6 and 7, I have shown U-bars 23 and 24, which are connected by means of adjustable tension bolts 25, whereby the U-bars 23 and 24, may be drawn up to reduce the diameter of the carrier members 1 and 2.

It is obvious that the carrier is well adapted for use in carrying tires which may become deformed or changed in size after use. The resilient members 9, as shown in Figs. 1 to 4, inclusive, act automatically as a compensating means for holding a tire tightly in place and adapting the carrier without adjustment for use with tires of slightly different size, but a further adjustment is provided by shifting the bolts 8, and contracting or expanding the semi-circular members 1 and 2, if so desired. In any event, a tire, either new or old, when carried in this device, is securely held in position in the carrier. For instance, in the form of device as shown in Figs. 1 to 4, a new tire may be carried upon the inner semi-circular carrying member, held tightly therein by the resilient members 9, and a slightly enlarged used tire may be carried in the outer semi-circular carrier member 1, the U-bars 6—7, of course, having been adjusted for the purpose.

In an application filed by me October 30, 1917, Serial No. 199,232, which is a division of the present application, there have been embodied claims covering the broad idea of a curved carrier, and means for contracting and expanding said carrier to adapt it for tires of different sizes. This case, therefore, while disclosing this broad idea, is restricted to such details of construction as are not disclosed in said divisional application.

I am aware that various details of construction may be varied through a wide range without departing from the principles of this invention, and I therefore do not purpose limiting the patent granted otherwise than necessitated by the prior art.

I claim as my invention:

1. In a tire carrier of the class described, curved supporting means, mechanism for attaching the same to a motor car, means expanding and contracting said means to adapt the same for carrying tires of different size and resilient members on said supporting means adapted to contact and hold a tire therebetween.

2. In a tire carrier of the class described, curved carrier means adapted to receive a tire deposited therein, mechanisms for contracting and expanding said means and holding the same in a contracted or expanded position to retain a tire securely in place therein, and resilient plates secured to the curved carrier means extending upwardly to the top thereof adapted to yield to compensate for tires of varying sizes.

3. In a tire carrier of the class described, curved carrying means, adjustable mechanisms connecting the upper ends thereof whereby said means may be contracted and expanded and held in contracted and expanded positions, and resilient inwardly arched means secured on said carrying means to bear against the surface of the tire and hold the same securely in position in said means.

4. A tire carrier of the class described comprising semi-circular beaded means, adjustable bracing reinforcing mechanisms attached to the upper ends thereof adapted to contract and expand said means for different sizes of tires, oppositely yielding members secured in the beaded means adapted to compensate for tires of varying diameters, and attaching brackets secured on said first named means for attachment thereof on a motor car.

5. A tire-carrier comprising semi-circular carrying means, U-bars secured to the upper ends thereof in overlapping relation and each having a series of apertures therein, and connecting bolts for attaching said U-bar ends one to another to expand or contract said carrying means to adapt the same for different sizes of tires, and means in the carrying means adapted to frictionally engage opposite sides of a tire and adapted to yield to compensate for tires of different sizes.

6. A tire carrier of the class described comprising a curved carrying means, mechanism for positively expanding and contracting the same to adapt the same to receive tires of different sizes, and mechanism associated with said means operating automatically to hold the tire snugly therein compensating for slight differences in sizes of tires.

7. A tire carrier of the class described comprising a pair of carrying means adapted to receive a pair of tires therein, means for locking the tires in said carrying means, mechanism for contracting and expanding said carrying means to adapt the same for different sizes of tires, resilient elements mounted in one of said means operating automatically to compensate for various sizes of tires for which the carrying means are adjusted, and attaching brackets for mounting the device upon a motor car.

8. In a tire carrier the combination of an integral member bent longitudinally in a semi-circular form so as to circumferentially engage substantially the lower half of a tire and having means bent inwardly at each end thereof to hold a tire upright on said member, and means adjustably connecting the opposite ends of said member so as to adjust the curvature of said member to fit the circumference of tires of different sizes.

9. In a device of the class described a substantially semicircular carrier element, a cross member joining the ends thereof, and resilient members disposed at the ends of said element to contact against and aid in supporting an article therein.

10. In a device of the class described a curved carrier element capable of being bent to change the size thereof, bars attached to the ends of said element and extending inwardly thereof substantially alined, and said bars constructed for attachment to one another in different relations to hold the carrier element bent to a certain size.

11. In a tire carrier of the class described a semicircular, curved and concave carrier element, bars secured to the opposite ends thereof and extending inwardly toward one another and substantially alined, each of said bars on the ends of the carrier element of U-form affording arms extending on each side of the carrier element to receive a tire therebetween, and means for connecting the inner ends of the arms of said bars in different relations to rigidly hold the carrier element bent to a particular size.

In testimony whereof I have hereunto subscribed my name in the presence of two subscribing witnesses.

WALTER R. GREEN.

Witnesses:
CHARLES W. HILLS, Jr.,
EARL M. HARDINE.